March 17, 1964
A. BOLENBACH
3,125,138
GANG SAW FOR IMPROVED TONGUE AND GROOVE
JOINTS FOR FLOORING
Filed Oct. 16, 1961
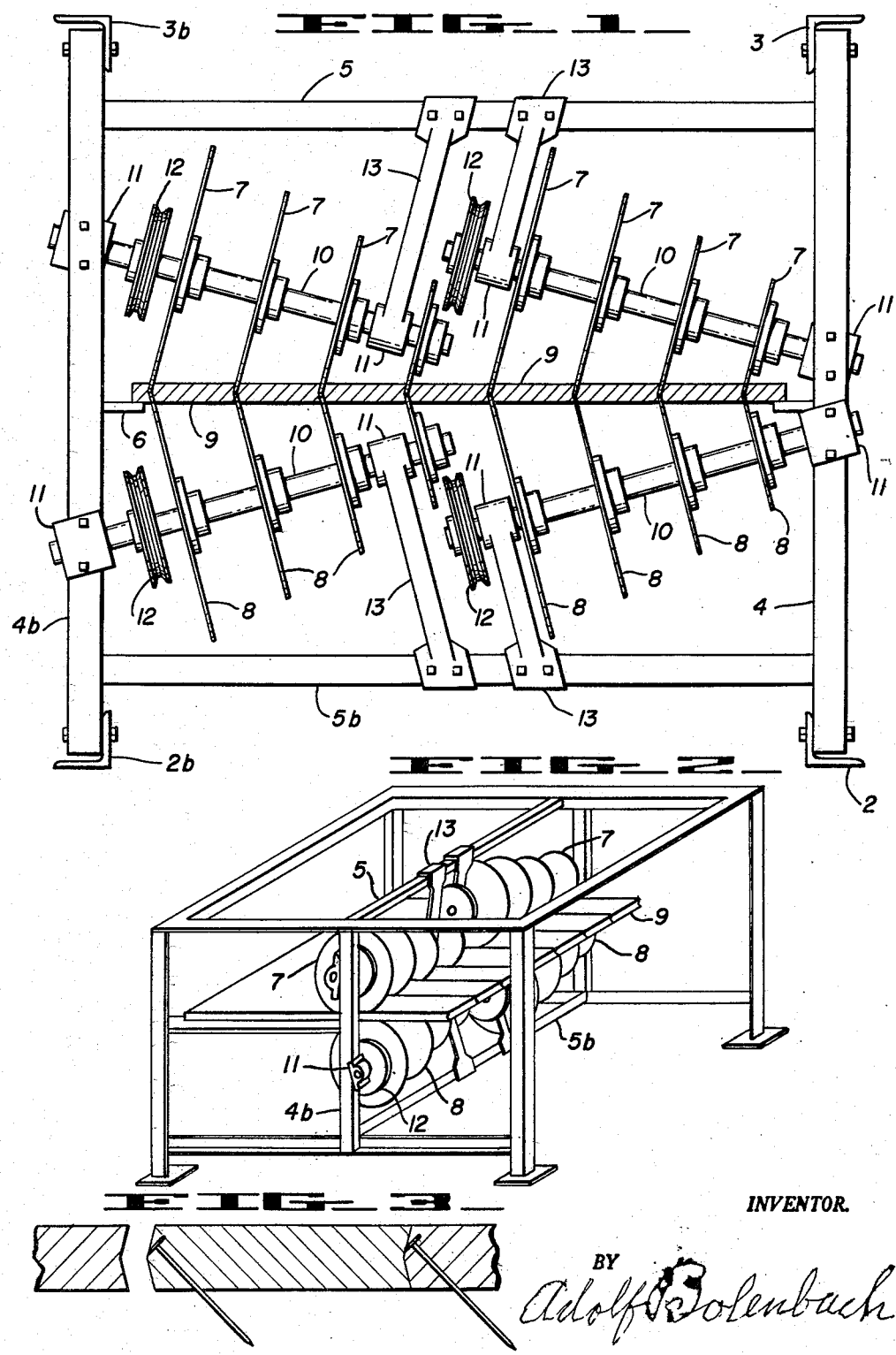
INVENTOR.
BY Adolf Bolenbach

United States Patent Office 3,125,138
Patented Mar. 17, 1964

3,125,138
GANG SAW FOR IMPROVED TONGUE AND GROOVE JOINTS FOR FLOORING
Adolf Bolenbach, 12630 Gail Ave., Sunnyvale, Calif.
Filed Oct. 16, 1961, Ser. No. 145,511
1 Claim. (Cl. 143—38)

This invention relates to a new improved table gang saw that saws several improved flooring boards or siding etc., each with an improved blunt beveled edge tongue and groove out of finished wide boards, sheets etc.

The main object is to cut with my saw wide boards or sheets into narrow flooring or siding strips each strip having one edge sawed into a blunt beveled tongue and the other edge into a corresponding blunt groove in one operation.

At present 3" to 5" strips are rough sawed, then each strip has to be handled many times in stacking, planing, sanding, sizing and then having one edge cut into a thin, long tongue and the other edge into two thin, narrow lips with a groove between them, then they are stacked again and finally loaded and hauled to the job.

It would save a lot of time and labor to handle one wide board instead of four narrow ones through so many operations and then cut the wide board into strips in one operation providing improved joints, and the saw can be built wide enough to saw several 9" to 10" wide boards at a time into flooring or siding strips with greatly improved joints.

My blunt tongues and blunt lips of the groove can not warp, split or break like those of the present joint and they make the smoothest, strongest joint possible and the nails do not split or break the blunt tongue but drive in quickly and hold the boards firmly to the sheathing. Half inch flooring of soft woods has not been used even on sheathing because the lips and tongues of the present joints would be too long, thin, and weak and would break, warp and split too easily while handled and nailed and are not strong enough to hold the boards in line on the floor but my half inch flooring and siding on sheathing or 16" studs make an airtight, smoother, stronger, trouble free floor and wall than the present one-inch boards and save half of the lumber and seventy percent of the labor grooving one strip at a time.

Since regular gang saws on a shaft are of the same size they can only make vertical cuts into boards, hence I use a short medium acute angle shaft on two bearings and of the length to cut a nine-inch board into three strips, each with a blunt angle beveled edge and a blunt angle groove of the same saw cuts forming about a hundred and fifty degree angle beveled edge tongue and groove.

A three-inch saw on the shaft would make the first angular cut halfway into one edge of the board, the fourth saw about nine inches wide would make the last cut into the other edge of the board, the other two saws would be spaced between and sized to cut halfway into the board from above. There is one or more gang sets of saws above and below the board and the table as shown in FIG. 1, the lower sets sawing half way angular cuts upward.

On wider boards the last saw on the shaft may become too wide and vibrate and sway too much, therefore, I invented the method of spacing the saws on two or more sets of short medium angle shafts and using a crossbar attached to the vertical bars above and below the table with short bars on the crossbar for some of the bearing supports for extra gangs. Extra sets can be spaced to run several wide boards through at a time, each board having room for a guide bar and a pressure guide, which are not needed when several sets are used to saw wide boards.

All sets are motivated from horizontal shafts with belt or chain-belt. Pressure and feel rollers, guides, etc. will be added.

Also, for siding, small saws on a shaft can be added to cut a small part of the exterior lip to form a small surface groove out of the siding joints.

The saw can be built wide enough for 32" or 48" sheets of oak plywood for flooring.

FIG. 1 is a front view of a vertical cross-section, through the saw sets and supports.

FIG. 2 is a perspective side view of the frame and the upper set of saws and a part of the lower set.

FIG. 3 is a cross-section of flooring boards showing saw cuts.

FIG. 2 shows a frame of four upright corner angle irons connected at the tops by four angle irons 3, and a distance below the table 6, connected by irons 2, of which the right side and left side angle irons each supports on its horizontal part near its center a vertical bar 4 which extends to near the horizontal upper part of the side angle irons 3 and each is bolted through vertical slots therein to the vertical part of the upper and the lower angle irons 3 and 2. The slots permit movements of bars 4 and their attached cross bars 5 to be adjusted up or down to different thicknesses of boards.

The upper cross bar 5 and the lower cross bar 5 are firmly attached to bars 4. Short bars 13 are firmly attached to the upper and lower bar 5 and extend vertically to the ends of a shaft not attached to bar so that the shafts bearing supports 11 can be attached thereto.

The saws 7 and 8 on a shaft 10 are firmly attached thereto, spaced and sized to cut half way into a board 9 to cut strips to an exact width and with bevelled tongue and groove of an exact angle. A gang saw set cannot be used for a different spacing or angle.

All shafts 10 are motivated on two bearings 11 by pullies 12 and belt or chain-belt and are placed at a medium acute angle to keep the increase in the saw sizes low and the angle of the bevelled edges at a desired blunt size. Different thickness of boards or sheets ranging from ¼" to ¾" can be cut with the same gang saws by moving the bolts of bars 4 in the slots on angle irons 2 and 3. When only one set of gang saws is used in the saw machine to saw from 9" to probable 12" boards cross bars are not needed but become essential to the use of several sawsets for wide boards or a sheet.

The bearing supports 11 are fastened through slots to bars 4 and 13 for slight vertical movements to regulate the depth of the saw cuts to the exact center of the boards when saws have been sharpened several times. To prevent interference of the upper and lower saws the lower bearing supports 11 and cross bar 5 are attached to the front side of the thick bars 4, and the upper bearing supports 11 and cross-bar 5 are attached to the back side of bars 4. For boards from 12" up two short shaft gangs are needed and for wide sheets several gangs are used.

A set of gangs that will saw a twelve-inch board into bevelled edge strips may not be practical for precision sawing. If the shaft has an angle of 45 degrees and we use a 3" first saw then we must have a 20" saw to make the last cut. To avoid this size I split that angle and get a 12" saw, questionable compared with a 3" saw, but I can't reduce the angle more since the beveled edge would get too blunt, hence, shorter shaft sets must be used for widest boards or sheets, or to run several boards through at a time.

I claim:

An improved table gang saw comprising a framework in the form of a rectangular parallelepipedon having two sides, two ends, a vertical bar near the center of each side of the frame and attached slidably up or down to the upper and lower part of the frame, a top element, a lower element near the bottom of the framework and a slotted horizontal worktable intermediate the height of the framework; two upper bearings above the worktable and secured one at each side of the framework; two upper bearing-supporting arms depending from the mid-portion of the top element with the bearing in each alined with the upper bearing nearest it; an upper shaft journalled in each pair of such alined bearings; an upper series of spaced circular saws of progressively increasing diameters mounted on each upper shaft for rotation therewith, said upper bearings, shafts and saws being so inclined and positioned above the worktable as to produce a series of inclined cuts of equal depths in the top of a work piece on said worktable; two lower bearings below the worktable and secured to the respective sides of the framework; two lower bearing supporting arms extending upwardly from the mid-portion of said lower element with the bearing in each alined with the lower bearing nearest it; a lower shaft journalled in each pair of these alined bearings; a lower series of spaced circular saws of progressively increasing diameter mounted on each lower shaft for rotation therewith; said lower bearings, shafts and saws being so inclined and positioned below the worktable that the saws being so inclined and positioned below the worktable that the saws project through the slot in said worktable and make a series of inclined cuts of equal depths in the bottom of a workpiece on said worktable; the upper and lower saws combining to cut obtuse-angled V-sectioned kerfs in a wide board to divide it into a plurality of narrow boards with obtuse-angled matching edges; and means to rotate said shafts and saws.

References Cited in the file of this patent

UNITED STATES PATENTS

| | | |
|---|---|---|
| 1,463,791 | Brekelmans | Aug. 7, 1933 |
| 2,974,692 | Bolenbach | Mar. 14, 1961 |

FOREIGN PATENTS

| | | |
|---|---|---|
| 121,920 | Germany | July 6, 1901 |